(12) United States Patent
Harris

(10) Patent No.: US 10,947,687 B2
(45) Date of Patent: Mar. 16, 2021

(54) HYDROPOWER INSTALLATION

(71) Applicant: Progenesys, Houten (NL)

(72) Inventor: Guy Gardner Harris, The Hague (NL)

(73) Assignee: PROGENESYS, Houten (NL)

( * ) Notice: Subject to any disclaimer, the term of this patent is extended or adjusted under 35 U.S.C. 154(b) by 24 days.

(21) Appl. No.: 15/547,114

(22) PCT Filed: Jan. 29, 2016

(86) PCT No.: PCT/NL2016/050071
§ 371 (c)(1),
(2) Date: Jul. 28, 2017

(87) PCT Pub. No.: WO2016/122326
PCT Pub. Date: Aug. 4, 2016

(65) Prior Publication Data
US 2018/0010311 A1    Jan. 11, 2018

(30) Foreign Application Priority Data

Jan. 30, 2015    (NL) ...................................... 2014216

(51) Int. Cl.
*E02B 9/06* (2006.01)
*F03B 15/08* (2006.01)
(Continued)

(52) U.S. Cl.
CPC .................. *E02B 9/06* (2013.01); *F03B 1/02* (2013.01); *F03B 1/04* (2013.01); *F03B 15/08* (2013.01);
(Continued)

(58) Field of Classification Search
CPC .... E02B 9/00; E02B 9/06; F03B 15/08; F03B 1/02; F03B 1/04; F16L 3/12; F16L 9/12;
(Continued)

(56) References Cited

U.S. PATENT DOCUMENTS

| | | | |
|---|---|---|---|
| 5,180,254 A * | 1/1993 | Matiere | E02B 9/06 138/105 |
| 6,484,758 B2 * | 11/2002 | Matiere | E02B 9/06 138/106 |

(Continued)

FOREIGN PATENT DOCUMENTS

| | | |
|---|---|---|
| CN | 101260660 A | 9/2008 |
| CN | 103306250 A | 9/2013 |

(Continued)

OTHER PUBLICATIONS

Machine translation, DE3238556A1, Water-power station, Kinemura et al., published May 11, 1983, obtained from https://worldwide.espacenet.com/, pp. 1-3. (Year: 1983).*

(Continued)

*Primary Examiner* — Grant Moubry
(74) *Attorney, Agent, or Firm* — Kacvinsky Daisak Bluni PLLC

(57) ABSTRACT

A hydropower installation includes a water supply and an energy generating station, with the supply at a higher level than the energy generating station; and a duct extending between the supply and the energy generating station. The energy generating station of the hydropower installation is configured based on high water velocity and low pressure. The duct may comprise plastic pipes. The duct may be arranged on a foam support and enclosed by a foam embedment. The duct may comprise at least two duct sections, with an intermediate energy generating station arranged between the duct sections of the duct. The duct may comprise internally extending protrusions, such as dimples to promote a laminar flow of fluid through the pipe. The duct may taper. Water pressure inside the duct may be maintained at atmospheric level. The proposed features all contribute to a pressure free velocity based system.

20 Claims, 4 Drawing Sheets

(51) Int. Cl.
*F03B 1/02* (2006.01)
*F03B 1/04* (2006.01)
*F16L 3/12* (2006.01)
*F16L 9/12* (2006.01)
*F15D 1/00* (2006.01)
*F15D 1/06* (2006.01)
*E03C 1/12* (2006.01)

(52) U.S. Cl.
CPC ............... *F15D 1/005* (2013.01); *F15D 1/06* (2013.01); *F16L 3/12* (2013.01); *E03C 2001/1206* (2013.01); *F05B 2280/4003* (2013.01); *F16L 9/12* (2013.01); *Y02E 10/20* (2013.01)

(58) Field of Classification Search
CPC .... F15D 1/005; F15D 1/06; F05B 2280/4003; Y02E 10/22
See application file for complete search history.

(56) References Cited

U.S. PATENT DOCUMENTS

| | | | |
|---|---|---|---|
| 7,696,280 B2* | 4/2010 | Krishnaswamy | C08L 23/04 525/191 |
| 2010/0086356 A1* | 4/2010 | Hopf | E02B 3/04 405/36 |
| 2012/0227853 A1* | 9/2012 | Bauer | F16L 9/006 138/177 |
| 2014/0186174 A1* | 7/2014 | Malfa | F01D 25/24 415/220 |
| 2014/0348591 A1 | 11/2014 | Hamman | |

FOREIGN PATENT DOCUMENTS

| | | |
|---|---|---|
| DE | 3238556 A1 | 5/1983 |
| DE | 202006016550 U1 | 3/2007 |
| GB | 2133087 A | 7/1984 |
| WO | WO2005108484 A1 | 11/2005 |

OTHER PUBLICATIONS

Machine translation, CN103306250A, In-tunnel diversion type cascade hydropower station and construction method thereof, Luo, published Sep. 18, 2013, obtained from https://worldwide.espacenet.com/, pp. 1-7. (Year: 2013).*
https://sprayfoaminsulationmaine.com/foaming-a-trench-in-midcoast-maine/spray-foam-insulation-trench/; publ'n date May 17, 2012 . (Year: 2012).*
International Search Report and Written Opinion dated Jun. 2, 2016 for PCT/NL2016/050071 filed Jan. 29, 2016.
Chen, et al., "Sticky Wickets: Custom-made trolley simplifies penstock inspections," Hydro World, Apr. 1, 2008, http://www.hydroworld.com/articles/hr/print/volume-27/issue-2/departments/sticky-wickets-custom-made-trolley-simplifies-penstock-inspections.html.
Boudreaux, et al., "Reclacing an Aged Woodstave Penstock," Hydro Rview, May 20, 2014, http://www.hydroworld.com/articles/hr/print/volume-33/issue-4/articles/replacing-an-aged-woodstave-penstock.html.
Author unknown—[Ковшовая турбина]—Wikipedia—Acquired Sep. 27, 2019—URL: https://ru.wikipedia.org/wiki/%D0%9A%D0%BE%D0%B2%D1%88%D0%BE%D0%B2%D0%B0%D1%8F_%D1%82%D1%83%D1%80%D0%B1%D0%B8%D0%BD%D0%B0.
Author unknown—[Pelton wheel]—Wikipedia—Acquired Sep. 27, 2019—URL: https://en.wikipedia.org/wiki/Pelton_wheel (Translation).

* cited by examiner

HYDROPOWER INSTALLATION

Hydropower is an important source of sustainable energy, and will become even more important in the future. Scandinavian countries have decided to invest in hydropower development in the form of subsidisation of green energy. However, building costs for hydropower installations have historically been very high, making it an unattractive market for investors. It is an objective of the present disclosure to optimise construction times and to reduce building costs further. This disclosure relates to different technical solutions for building the duct of a hydropower installation, sometimes also referred to as a Penstock, by which herein below in particular the duct is referred to.

The Penstock is one of the most expensive components of a hydropower installation and typically comprises about 25% of total building costs.

Although there is a move towards newer technologies, in most current installations the Penstock is made out of Ductile Iron. Ductile Iron is durable, strong and cost-effective. However, there are some serious disadvantages in using Ductile Iron. In the first place, Ductile Iron is very heavy, making it difficult to transport to those remote and steep areas where any hydropower installation is to be installed. Secondly, Ductile Iron needs careful protection against corrosion and must be earthed. Thirdly, because of its stiffness, water-hammer pressures can become very great in Ductile Iron Penstocks, even to the point of an explosion to rupture the duct, to cause loss of life and total loss of operations. Penstock that fails gives no useful warning—it simply explodes. Penstock failures are spectacular and dangerous, and rarely detectable prior to the event, as loss of structural integrity of the pipe is generally momentary, and certainly not in a timeframe where a useful human intervention can be made to avert failure. Lastly, the friction coefficient of Ductile Iron is relatively high, creating large head losses due to friction in relation to water flow through the duct. In fact, all such problems are directly related to the basic principle of prior art hydropower installations, which are pressure based to drive turbines at a lower end of a downward oriented duct. To generate the required pressure, a tremendous amount of water needs to be contained in the downward oriented duct. Under then prevailing pressures, any material flaw or fatigue could result in the above described disastrous effects.

In a 'classic' turbine/generator set, the energy of the falling water is converted into torque, which forces the turbine/generator axle to rotate, thus generating electrical energy in the rotor/stator set. One of the unfortunate effects of this system is that great load is placed on the bearings in the turbine/generator set, because the axle is normally perpendicular either to the water flow in an impulse turbine or to the changes in pressure in a reaction turbine, although there are variations in this set-up.

DE 32 38 556 A1 discloses a (small-scale) pressure-based hydropower station, in which an obliquely inclined top water conduit extends between a water inlet in a dam and a turbine wheel for the drive of an electric generator or power generator, which are arranged at a level below the water inlet. The top water conduit comprises an armoured or reinforced plastic laminate pipe whose coefficient of roughness of the inside surface is smaller than that of a concrete or iron pipe, reducing friction-related dynamic pressure losses in the top water conduit. The water velocity in this pressure-based hydropower station is in the range of 1-2 m/s, i.e. 3.6-7.2 km/h.

The present invention is related to a hydropower installation, comprising a water supply and an energy generating station, where the supply is at a higher vertical level than the energy generating station, and a duct extending between the supply and the energy generating station, and wherein the energy generating station of the hydropower installation is configured based on high water velocity and low pressure. High velocity and low pressure reduces the load placed on the bearings in the turbine/generator set, and hence increases life span and reliability.

The energy generating station of the hydropower installation according to the present invention is configured based on water velocities in the range of 40-50 m/s, i.e. 144-180 km/h at a typical head of 100 metres.

To illustrate the difference in pressure values using the present invention, existing systems build hydrostatic pressure according to the following equation:

$$p = h * \rho * g$$

where:
p=pressure
h=head, or height of column of water
ρ=density of water
g=gravitational constant It is common practice to quantify hydrostatic pressure in relation to atmospheric pressure, usually designated as ATM or Bar, at the linear rate of an increase of 1 ATM or Bar for each 10 metres of head. As such, because the present invention prevents an increase in hydrostatic pressure by allowing the water to accelerate freely, the water pressure remains close to 1 ATM at 100 metres of head, whereas existing systems would build hydrostatic pressure of 10 ATM.

The prior art for laying underground Penstock has been used for many years and has proven to be moderately adequate, but fault prone. Internationally, the method most commonly used is 'above ground Penstock' made out of Ductile Iron. The Penstock is commonly placed on (reinforced) concrete supports with cradles that support the pipe itself. As an alternative, underground installation is used. For underground installation solutions with and without anchoring may be used. In Norway, Penstock must be buried wherever possible, for aesthetic reasons. Other national authorities may have similar requirements. Herein below, the proprietor of the present disclosure may occasionally be referred to as the inventor, for the sake of simplicity of the below disclosure and description, even though the inventor is not the proprietor.

For underground installation, as required in some countries, for example based on aesthetic reasons, a trench is dug and if needed underlying rock is blasted by using explosives. The bottom of the trench is flattened and graded aggregate is used to create the bedding for the pipe. A drainage pipe is also inserted in the bedding. The bedding material is indented around the joint area to make sure that the weight of the pipe is supported along its whole length. In Norway and/or other countries, due to transport considerations, pipes may not be longer than 6 meters under normal circumstances. The 6 m pipe pieces are joined together inside the trench, using different types of joint, such as Muffles, for instance.

After correct placement of the pipe, the trench is filled with 'graded aggregate' in several layers. Each layer is compacted before the next layer is added. This process continues until the trench is filled to about 20 cm or more or less, depending on circumstances and requirements, above the crown of the pipe. A geotextile layer may then be applied to avoid finer material from the final Backfill mixing with the graded aggregate underneath and blocking the drain. On top of the geotextile, Backfill is placed, preferably using the material from the original trench excavation.

A relatively new and innovative material is GRP, Glass Reinforced Polyester. Pipes made out of this material are much lighter, and therefore cheaper in transport and easier to install. The pipes can be nested for transport, if convergent, which is not possible with uniform diameter Ductile Iron pipes. Plastic pipes are more flexible, making them better at absorbing stresses caused by, for example, geological activity or water-hammer. Plastic pipes do not need any coating. GRP pipes have a lower friction coefficient and the head losses from friction inside the pipe are smaller than with Ductile Iron, resulting in a more efficient flow inside the pipe, further reducing water hammer and turbulence, and enabling duct segmentation with intermediate turbines and generators.

Glass Reinforced Polyester (GRP) pipes have major advantages compared to Ductile Iron pipes, and these advantages make the use of Ductile Iron unnecessary and unwanted in many Small-scale Hydropower (SHP) applications. Due mainly to the maximum pressure rating of GRP pipes, which is generally lower than that of Ductile Iron pipes, but also because of regulations and license requirements from the Norwegian Water Authority (NVE) or other national authorities, SHP design engineers are restricted in their ability to use any other than Ductile Iron pipes. As a result of the research carried out over the last two years, it is the inventor's belief that wherever GRP pipes can be used, they should be used. Ways of making and/or employing GRP pipes are investigated that are anticipated to be viable in those very high-pressure applications where NVE and/or other national authorities currently insist on Ductile Iron.

Currently, in the field of hydropower installations, the NVE (the Norwegian Waterways Authorities), and other national authorities, do not even contemplate GRP as an alternative for Ductile Iron in installations with a very high head above 30 bar. There may still be some way to go in proving the concept of using GRP pipes in different technical solutions so that, hopefully and/or expectedly, in the future GRP pipes will be more easily accepted and find broader application. Success will largely depend on the way the GRP pipes are installed and the technical solutions used. It is anticipated that national authorities like the Norwegian NVE can be convinced that GRP pipe can be safely and successfully used in many different circumstances and that this will help in keeping SHP building costs down.

Coupling of GRP pipes may be done in several ways. Most frequently sleeves with a form of pressure gasket are used as joints. Alternatively, flanged joints may be used or the pipes may be 'welded' on site using filament mats and/or resin.

As an alternative for, or as an addition to normal GRP pipes, polyurethane pre-insulated pipes also exist. These pipes are widely available, and may be applied in an embodiment according to the present disclosure, but currently normal GRP is preferred.

A complementary idea to improve stability and reliability is to cover conventional ductile iron penstock duct or GRP pipes in foam. This foam will serve several functions: it will protect and stabilise the pipe, it will reduce the need for heavy and expensive Backfill and it will stabilise the ground and the trench, whilst taking radically less time to complete the full Penstock installation process. In particular when GRP pipes are embedded in foam, a far better adherence of the foam to the GRP pipes is achieved, than in the case of ductile steel being used. Ductile iron pipes are normally covered with a zinc coating or other coating, to which the foam can adhere far less well than to GRP. This effect is in particular present in case the GRP penstock and the foam comprise compatible elements/aspects in this respect, where the foam and plastic material of the duct are related to exhibit enhanced adherence, for example when using polyurethane foam and a GRP penstock for the duct of adherence compatible material. The GRP penstock and the foam effectively form a strongly interconnected whole, thereby improving stability, robustness and reliability, combined with increased flexibility and water hammer resistance.

It is noted in this respect that composition of Backfill is effectively the responsibility of the project engineer and the pipe manufacturer; for example, Norwegian rules or regulations that govern backfill are based on performance characteristics and do not prescribe use of any material for the backfill. It is just a historical consideration to try to use material excavated when digging a trench to insert the duct or Penstock therein. However, any alternative material should pass inspection, as long as Backfill material has satisfactory properties with regards to drainage and leaching, and satisfies any other legal requirements. To achieve this, Backfill must contain no very fine soil types [sand], and normally a lower limit of 8 mm is set for the minimum allowable grain size. Thus, although typically use is made of crushed rock or natural gravel with grain size 8-32 mm, where the maximum permissible stone size depends on factors such as pipe materials and surface treatment and is usually specified by the pipe manufacturer, there's no consideration resisting the implementation of alternative materials, such as foam material.

The object of the present disclosure is also to optimise the general construction process for creating hydropower installations; the present disclosure covers the case of installation of Penstock. To this end, a new method for laying pipe has been investigated, without the very expensive prior art process that uses graded Backfill.

In the standard installation process, the pipe is laid on a flat bed of graded aggregate and then surrounded by further layers of compacted aggregate. The material that is extracted in digging the original trench, into which the pipe is laid, is normally a mixture of gravel, rock, soil and sand. This material is not suited for use either as pipe bedding or as embedment. There are currently two solutions to this problem; the inventor is not content with methods and installations based on:

1. crushing rock and sieve Backfill material to get the right grading, and/or
2. ordering out for large amounts of graded gravel Both methods incur very high costs, due mainly to logistics and time requirements. The risk of penstock failure is also considerable with this installation method due to the impossibility of conducting a post-installation survey.

The risk of the penstock failing, installed according to the before mentioned procedure, is relatively high compared to other risks. When this fact was seen, investigations were initiated into options for improvement of penstock installation, reducing both risk and costs.

The initial idea was to cover the GRP pipes in pre-expanded polystyrene, a building material that is widely used in underground construction. Although useful results were achieved and this new development is encompassed in the present disclosure, the use of this material proved to be relatively complicated for installation around pipes and provided no meaningful extra mechanical or chemical protection against Backfill, as well as not delivering the desired commercial benefit.

Pre-insulated pipes are made using an outer casing of High Density Polyethylene pipes (HDPE) with Polyurethane (PU) foam filling the space between the two pipes. Because these pipes are normally used for thermal insulation, the pipe laying process would not alter with this solution. Also, the cost of this type of pipe is very high and therefore not worth further investigation. This method was dismissed quickly.

Research has resulted in a selection of PU foam alone, which comes either as a pre-fabricated product or as a 'spray-in-place' solution. The pre-fabricated options that were considered were pipe sections or pipe supports that had to be installed at the same time that the pipe was laid. As with pre-expanded polystyrene, installation involves a lot of work, needs to be very precise and does not make the pipe installation process easier or cheaper.

PU foam is formed combining a polyol resin and polymeric MDI to create a rapid-setting foam with a typical density of between 30 and 70 $kg/m^3$, depending on the product used. The foam may be open (flexible) or closed (rigid) cell. Additives are often used to enhance foam properties, depending on the requirements, for example flame retardants or reaction accelerators.

It became apparent that the optimum, but not exclusively the only choice from available foam materials, is rigid PU foam, in either 'spray-in-place' or 'poured' applications. Due to technical development of PU foam in recent years, it is now possible to produce foam on-site that is stable, quick to install, durable, strong, waterproof and environmentally friendly, using a water based 'blowing process'. Whereas HFC's (hydro fluor carbon) were needed in the past as blowing agent, foams are now available that are water-blown, and therefore much more environment friendly.

There are two major differences between water- and HFC-blown PU foams:

Commercial: Norway sets a high import tariff on products that have a high 'Global Warming Potential' (GWP). The HFC typically used in commercially available foams has a global warming potential of about 1300 times that of carbon dioxide. Calculations show that there is little difference in the price once applied, but the inventor considers that using HFCs is likely to cause unnecessary trouble with the environmental movement in Norway, and also has a wish to be as environmentally friendly as possible.

Technical: HFC-blown foam is typically lighter, cures at lower temperatures and has better insulation properties. For example, HFC-blown foam has an approximate reference value of 30 kg/m3, whereas water-blown is considerably denser at 45 kg/m3. This increased density accounts for the fact that the two applications are approximately equal in price on the Norwegian market—the HFC tax is offset by the increased use of materials using the water-blown foam.

PU foam is installed on-site, using a spray rig that can be ordered from multiple manufacturers, such as Graco Ohio Inc.

Application of the foam is relatively straightforward: the pump heats and pressurises the two foam components, forcing them down parallel hoses to a gun with an adjustable flow and nozzle system.

Current thinking is that, under normal circumstances, one sprayer will work with the pipe installation team to create trench breakers, install the pipe and then fill the trench with foam. Training teams for using spray equipment and training on installation procedures will take a few weeks. The exemplary Graco HFR has a flow capacity of ±20 kg per minute, meaning that the spray pump can create approximately 0.5 $m^3$ of foam per minute.

The advantages of PU foam over aggregate Backfill are both technical and commercial in nature:

Better pipe protection. Foam exerts a much more even and predictable force on the surface of the pipe. Additionally, the adhesive properties of the foam mean that there is no 'rubbing' against the surface of the GRP, which inevitably weakens the integrity of the pipe over time.

Better pipe insulation. Foam has well-known insulation properties. The mechanics of this property should be fairly obvious to the reader, but the increased insulation is a result of the relative specific heat capacities of granite and the PU foam molecules, in conjunction with the trapped $CO_2$ gas in the cell structure of the PU foam.

Better geotechnical stability. Because the pipe is stuck to and inside a large homogenous mass of foam, it is effectively completely immobilized. This means that the pipe elements cannot move in any plane: this is particularly important when using non-anchored pipelines. Any movement of pipe elements, relative to each other and coupling systems causes a negative change in the flow properties (cavitation and non-laminar flow) as the internal surface of the pipe becomes irregular or less flat. Over time, some pipe systems that do not use a stopper/gasket between the pipe ends also degrade: this is completely avoided with the use of foam.

Near zero deflection/ovality: related to general geotechnical stability, the use of foam means that the force applied by the weight of the upper layers of general stone Backfill is transmitted more evenly to the trench surface, because of the compression and tensile strength properties of the foam. In short, using foam for penstock filling reduces the numbers of elements in the machine from effectively infinite (many stone particles interacting more or less unpredictably and according to changing conditions) to 3: the trench, the foam (containing the pipe) and the backfill, which acts uniformly on the foam from a mechanical point of view, due to the single interface. This predictability is the single greatest reduction of risk of failure in the penstock system due to use of PU foam. Calculations made using readily-available data from Huntsman, Covestro and Lapolla yielded the following approximate results, with foam sprayed around GRP pipes at 10° C., the likely ambient temperature in the Norwegian mountain areas in summer:

| Diameter of Pipe (mm) | KGf/m2 (weight of all trench contents included) | kPa (rounded to whole numbers) | Foam load capacity in kPa (ISO 844) | Security Factor |
| --- | --- | --- | --- | --- |
| 500 | 1533 | 15 | 173 | 11.3 |
| 800 | 1751 | 17 | 173 | 9.9 |
| 1400 | 2208 | 22 | 173 | 7.84 |
| 3000 | 3462 | 34 | 173 | 5 |

This table provides a comparison of different pipe sizes with associated load on trench bottom after installation and safety factors.

There is no need for graded Backfill: no sieving or grading is required. Locally available masses may be placed directly onto the foam, typically the masses excavated from the trench.

As for more commercially motivated advantages: the use of foam enables lower infrastructure costs, since there is no need to improve roads to be able to deliver hundreds of tonnes of graded Backfill; massively improved pipe-laying times and less project risk; lower excavation costs, as the technique means that square trench profiles can be used (due to Norwegian regulations); and current calculations show that foam is approximately the same cost by expanded volume as graded Backfill.

The preferred solution is to install the pipe as follows: foam pillows are sprayed in the bottom of the trench onto which a pipe piece is laid. An excavator can be used to push the pipe into the pipe coupling at the end of the part previously installed. To secure the pipe in place the pillows are then extended to trench breakers. Then the area between the trench breakers is completely filled with foam, starting at the bottom of the trench, filling up all the spaces until the pipe is surrounded by at least 20 cm of foam on all sides, or to the extent specified by the pipe manufacturer. The next length of pipe can be installed whilst the previous length is being sprayed with foam. Normal ungraded Backfill can then be put back on top of the foam, completing the installation process.

The consequence of this method is that the pipe can mostly be laid without people having to enter the trench, which means the trench may be dug square, at 90 degree angles, as presented in FIG. 4 showing a cross section of a trench with an inserted duct on a foam pillow. FIGS. 3 and 6 show a worker spraying foam to form a foam wall defining a bulk head type trench breaker, thus avoiding excavating more material than mechanically necessary to insert the pipe and foam. This creates a huge saving on labour and makes trench-digging an easier operation.

The combination of using foam as Backfill material and changing the pipe installation process creates a huge saving in labour, transport and material costs.

The diagram of FIG. 2 shows representation of a trench excavated according to Norwegian regulations, using PU Foam as an embedment and ungraded Backfill on top thereof. Therein, supports and/or foam walls forming bulk head type trench breakers may be present or omitted, depending on the precise embodiment of the present invention.

Based on case studies, the present inventors are confident that the real savings will be close to 50%. For an average project, this would reduce build costs from the industry standard calculation of NOK 3.5/kWh to NOK 3.0/kWh. It goes without saying that this achievement has a very high impact on the feasibility of SHP projects in Norway or elsewhere and their long-term operational viability, due to lower financing costs and lower debt burden once the plants are in production.

Pipes made out of Ductile Iron may have a lower ex-works price than GRP pipes. However, because they are heavier and cannot be nested, transport costs increase the price considerably. Another disadvantage is that only machines can move the pipes on-site, whereas GRP pipes for most projects are light enough to be handled by 2 or 3 men, depending on the diameter of the pipe. The Backfill around the Ductile Iron pipes needs to consist of graded aggregate; to get the required amount of aggregate needed to the site is both costly and time- and labour-intensive.

If using foam to entrench GRP pipes proves its value, we will also consider using foam around Ductile Iron pipes, where NVE specifies this. Lifetime costs may make GRP pipes cheaper than Ductile Iron. The main problem with Ductile Iron is corrosion, which is difficult to detect in operational circumstances. It is to be expected that using foam will considerably increase protection against corrosion of the external surface.

At the outset of investigating the possibilities for quicker and cheaper installation of Penstock, the idea came to mind that foam could be used as a cheap and light-weight alternative for Backfill. Foam is already used as building material, but is not commonly used for filling purposes. Its main application has so far been pipe and building insulation.

There are many different types of foam, which will be discussed in the next sections. The initial material that was proposed was extruded polystyrene, as this is widely available, cheap and approved for underground installations. Many roads and bridges rest on a foundation made out of extruded polystyrene. Further investigation showed that polyurethane foam may be a superior alternative to extruded polystyrene because it can be applied on site, but the present disclosure is consequently by no means to be interpreted as pertaining exclusively to polyurethane. Other insulation materials may also be employed for use as Backfill, which may even be materials that will only come into existence in a future relative to the present disclosure.

Pre-insulated pipes are readily available. The GRP pipe has a layer of polyurethane foam around it contained within an outer PVC casing. Insulated joints are used for continuous insulation. An available alternative is polyurethane foam applied by spraying it onto the pipe after manufacturing, but this type of pipe is not suited for underground installation.

Pre-insulated pipes are designed purely for thermal insulation, which means that the layer of foam is quite thin, whilst the density is relatively high. The inventor is looking for a more voluminous solution if possible. Also, the installation process is the same for pre-insulated pipes as for normal pipes. This means that installation is still labour intensive and that Backfill material needs to be of a high, specified standard, in view of the Backfill coming into contact with the outer surface of such pipes.

Early investigation showed that pre-insulated pipes were not expected to be a cost-effective solution. Not only is the price ex-works too high, transport costs are much higher because the pipes may also not be nested.

Extruded polystyrene is a closed cell polymer with a density range of about 28-45 kg/m$^3$. It is commonly used as insulation material in building projects, produced as pre-shaped material of varying thickness, and can be cut to size after production. Extruded polystyrene is non-biodegradable and stable when used in the environment.

During the production process, a blowing agent is added which is usually a hydro fluorocarbon (HFC-134a), which has a very high global warming potential. The modern manufacturers now produce extruded polystyrene without using hydro fluorocarbon, making it more environmentally friendly.

Extruded polystyrene can, however, not be produced on-site and is not ideal for transportation due to its large volume, although weight is not an issue in transportation. It is commonly used underground and with Backfill, for water and sewerage pipe-insulation applications. Current usage and application are different to the method originally investigated by the inventor. In current installations, the polystyrene is not placed directly on the pipe. The way others have installed it was like a box around the pipes, with Backfill between the pipes and the foam. A sheet of XPS (extruded polystyrene pipe) is used on all four sides of the pipe(s), creating an underground box in which the pipes are contained. Several manufacturers provide off-the-shelf solutions for this type of installation.

The inventor investigated the use of 'Jackofoam' around the GRP pipes as filling, protection and insulation. Jackofoam is a product produced by Jackon. The contemplated solution was to create slots in a plate of 50 mm thick Jackofoam 200 so that the plate would become flexible and fit around the pipe. However, prices for this contemplated solution from Jackon was NOK 45,000 for 750 m² of Jackofoam 200-50 mm. The 200 indicates a compression strength of 200 kN/m² in the short-term and has a 90 kN/m² compression strength in the long term.

The total amount of Jackofoam needed for a single 50 mm layer is (0.25+0.05)×π×262 m=0.94×262=247 m², not taking the joints into consideration. This is well below the 750 m² that was quoted to the inventor, but also thinner than the desired solution.

However, the practical application of Jackofoam may prove overly complicated. In practice, large blocks would have to be cut to size, slots would have to be cut to make it possible to fit the foam around the pipe and the foam would need to be glued to the pipe. Another problem is that the diameter around the joints is bigger and separate pieces would have to be cut for the joints. The extra labour involved makes this solution very expensive. Also, the foam does not bring any advantage in terms of stabilising the trench bed in any way. This means that careful installation of Backfill with proper drainage is still required to avoid washout and slippage of Backfill. Another problem was that it is not known how long the glue will hold after underground installation. It was reasoned that there is a risk of breakage if the pipe was not attached to the foam and was able to move inside it.

After consideration it became apparent, for several reasons, that this solution would most likely not result in an optimal solution, which is however not to be excluded from the present disclosure, even this concept was abandoned as a commercially and technically viable option for the moment (before the date of the present disclosure), because of the difficulties of getting the pieces cut to size, the extra labour involved and the lack of pipe support from the foam.

Pre-expanded polyurethane is made in many shapes and many densities. It is used for many applications, ranging from food packaging to building material. Pre-expanded polyurethane is poured in moulds in a discontinuous production process or can be poured between liners on a conveyer belt system to form continuous blocks.

Polyurethane is formed combining two components: an isocyanate ('A' component) is combined with a polyol ('B' component) to form a complex cellular structure. Catalysts and additives, for example flame retarding additives, can be added to create the material needed. There are many different isocyanates and polyols, creating a vast spectrum of polyurethanes, all with different properties. Manufacturers keep the recipes for their particular type of foam very secret, but they will be able to formulate foam that meets all requirements.

There are two main types of polyurethane: open and closed cell. The open cell polyurethane is highly flexible and used for insulation, food packaging, mattresses, furniture, cushioning, etc. This material is suited for indoor use mostly. The closed cell polyurethane is rigid and has more than 95% closed cells. This makes it water-impermeable, tough, durable and suitable for outdoor use. With increasing density, its compressive strength increases and it becomes less flexible.

Because polyurethane has excellent binding properties to a lot of plastics and metals, it is often used as insulation layer between layers of other materials. The liner materials often used are PVC and other plastics, aluminium, glass fibre and stone.

Pre-insulated pipes also fall in this category, and are discussed in the previous section.

Products can be obtained for use, such as pre-shaped pipe-insulation sections defining a circumscribing layer or pre-shaped pipe support sections defining supports for a duct. These insulation sections are available with lining or without lining Available linings are PVC or other plastics, aluminium or aluminium tape.

Installation of foam in this way is not easy. For the pipe support sections the bedding needs to be perfectly flat and aligned to make sure the pipe is evenly supported along its length. The pipe insulation sections are themselves subject to this problem to a lesser extent. Putting the foam around the pipes is in itself not difficult; the problem is the joint area between duct sections. The pipe is thicker around the joints, and the foam around the joints will have to be thinner to create the same diameter outer lining or if the same thickness of foam is used the bedding will have to be adjusted to accommodate this.

Because these products would only be designed for insulation and not for strength, a low-density foam is used. This means that the lining will have to be strong enough to make underground use possible. The price paid for the lining makes this solution not cost-effective. Another disadvantage is that the foam itself does not stabilise the ground. If the pipe is glued to the foam is will give some extra protection against sliding, but if the lining is put around the pipe without glue it is likely that the pipe will slide inside its sleeve, creating the same risk as described in relation to extruded polystyrene.

However, the unique properties of polyurethane foam make it possible to create the foam on site, where the foam sets perfectly around and fills already existing structures, e.g. a pipe inside a trench.

There are many advantages to application of the polyurethane in situ. There are two different ways of application: pouring and spraying. Pouring has the advantage that is quicker and that there is less risk of leaving voids. Spraying is more precise and creates less pressure during expansion. For spraying, a high-pressure unit takes for instance equal amounts of 'A' and 'B' components and mixes them in the nozzle. The foaming starts immediately after applying the foam. Several layers can be applied, creating the desired thickness. Even complete Backfill with foam is possible using this technique. However, excavated trench material is preferably re-used to at least partially fill up the trench.

There are many other advantages to in-situ application. For example, this application ensures greater ease of transport (raw materials come in buckets or drums). The foam will help stabilise the bottom of the trench because it will bind to the sediment and help keep the sediments in place. Also, the foam will readily bond with the GRP pipe itself, creating the largest possible stabilising area. The foam will find its way into gaps, the joints will not be an issue and foam can be applied unevenly if desired (for example, if only very little Backfill material was available in one section, more foam could be applied).

The pipe is well protected by the foam in several ways. The stresses on the foam, created by the weight of the Backfill material, will be transferred to the sides of the foam, minimizing compression on the pipe. However, stress distributions in and around the foam with the pipe in the middle are not currently fully known and could be subject of testing.

In the current installation method, the weight of the Backfill could cause ovalization of the pipe, which is likely to be aggravated when GRP pipes are to be employed. Such deformations cause an increase in non-linear flow inside the pipe, increasing energy losses and reducing efficiency. The stresses that have to be absorbed by the pipe wall also cause early deterioration of the pipe itself and negatively influence its expected life-time. All these problems are overcome with using foam around the pipe.

In recent years, many penstock failures have been known to occur because of improper installation of Penstock. What often happens in practice is that the Backfill is not placed correctly, in an attempt to rush Penstock installation and keep costs down. The consequence is that the ductile iron pipe is not evenly supported. When, after a few years, the soil surrounding the Penstock has washed out some more, for example because of improper drainage, the Penstock loses its support completely over a larger area, resulting eventually in pipe failure. This is also completely avoided by embedding the pipe in foam.

The flexibility of the foam will allow for thermal expansion and contraction of the pipe. Spikes and sharp edges on the Backfill material will not be able to damage the pipe inside the foam. The pipe is entirely protected. Also, the thermal insulation created will hinder the water inside the pipe from freezing and will protect the pipe from bursting on thawing conditions. Most importantly, the water inside the pipe will always freeze at a later point than the water source or supply.

The technique of underground use of rigid polyurethane foam may require further investigations. The potential environmental risks in the long term must be assessed better and documented, partly because the material has only been developed relatively recently, and partly because every type of polyurethane foam has different properties. However, tests performed on polyurethane foam used as insulation material for 30 years show that it has not lost any of its initial properties. The long-term strength of the foam decreases only about 5% as compared to new foam. This is minimal as compared to for example extruded polystyrene, which loses 55% of its initial compressive strength.

There are a few issues with the environmental impact of polyurethane foam. Traditionally, the foams were created using HFCs as blowing agents. Ozone-depleting HFCs have been banned and replaced with non-ozone depleting HFCs. HFC-245fa is most commonly used as blowing agent, but this presents a large problem, as it has a global warming potential of about 1300 times that of $CO_2$ and has a half-life of 7.2 years. Recently, water blown polyurethane foams have been developed, which are obviously completely HFC free in operation. The foams that are water blown are slightly more dense, between 40 and 45 kg/m$^3$, whereas the HFC blown foams are normally around 30 kg/m$^3$. Also, the insulation properties of HFC-blown foams are better and the temperature does not rise as much in HFC-blown foams as compared to water-blown variants.

Many governments across the world have imposed very heavy duty on HFCs, to discourage their use, where the level of duty is related to the global-warming potential (GWP), as a multiple relative to the GWP of $CO_2$. As a result, there is little difference in price between water and HFC blown foams Consequently, the water blown foam solution should normally be selected, mainly for two main reasons: the denser foam can withstand higher compressive forces (although in most installations this is not of any importance) and the overall solution fits better with the goal of environmentally friendly production.

Polyurethane foam is used, in separate or combined embodiments of the present disclosure, as trench breakers for stabilising ground and/or as embedment supporting the pipe in the correct position, and/or as Backfill. A layer of foam is sprayed in the bottom of the trench to the right height for pipe installation. The pipe is then put on top of the support (it sets within seconds) and foam is added to stabilise the pipe in the correct position. After the pipe is laid in this way, Backfill can be used between the supports. Backfill may also consist of foam, or even 'normal' aggregate. It is anticipated to be preferred to use foam as pipe support, trench breaker and Backfill material. The whole trench is filled with foam in this method up to about 20 cm above the crown of the pipe.

The trench breakers may be sprayed. It takes a matter of minutes to spray the foam to the correct height. For Backfilling the trench with foam, the output can be increased to a volume of 20 kg/min or less or more, depending on a used spray rig. The volume indicated can be achieved using the above referenced Graco HFR spray rig. An alternative that also seems suitable is to pour the foam used as Backfill in the bottom of the trench, making installation quicker than with spraying.

Because there are so many different types of foam, and because it is difficult to compare products from different manufacturers, we put together a list of minimum requirements for the foam. This looked as follows: density between 30 and 45 kg/m$^3$, compressive strength at 10% deformation minimum 170 kPa/m$^2$, closed cell %>90, water absorption <5%, HFC free. A foam that fulfils these requirements exceeds the technical, mechanical requirements, if a duct has a relatively small pipe diameter of for instance 500 mm or smaller. For other installations, this density is required to support the weight of the pipe filled with water and Backfill on top—for example, required for a 1400 mm pipe diameter duct. More information on this is presented in

| Diameter of Pipe (mm) | KGf/m2 (weight of all trench contents included) | kPa (rounded to whole numbers) | Foam load capacity in kPa (ISO 844) | Security Factor |
|---|---|---|---|---|
| 500 | 1533 | 15 | 173 | 11.3 |
| 800 | 1751 | 17 | 173 | 9.9 |
| 1400 | 2208 | 22 | 173 | 7.84 |
| 3000 | 3462 | 34 | 173 | 5 |

This table provides a comparison of different pipe sizes with associated load on trench bottom after installation and safety factors.

Health risks associated with the use of rigid polyurethane foam are well documented and the main concern is development of asthma, lung fibrosis and allergic reactions to MDA in workers from inhalation. This is expected to be preventable or overcome by careful installation and by wearing appropriate personal protection during installation. Once the foam is set, it does not release particles. In water-blown foams the cells contain $CO_2$, so release of gas from cells is not hazardous. Also, since the foam will be covered with Backfill, there is no atmospheric interface and therefore this risk is negligible.

Health risks associated with HFC-245fa, the blowing agent used in some products, have also been studied and it is effectively non-toxic. The cancer risk and teratogenicity (basically, the ability to cause birth defects and similar) are very low. It is almost non-biodegradable with a half-life of 7.2 years. It is unlikely to disturb the aquatic environment because of its high boiling point and low toxicity. However, the global warming potential of HFC-245fa is very high, and from a focus on environmentally friendly production, a product that is HFC free would be the preferred option.

Because of its inherently inert nature, rigid polyurethane foam can be used in drinking water areas. There are different national standards concerning drinking water area safety and most manufacturers comply with their own national standard. There are a lot of similarities in these standards, making it relatively easy to show compliance in different countries.

Other types of insulation material have also been investigated and are by no means excluded from the scope of the present disclosure. For example, glass wool (ProRox and Rocktight) and foamed rubber (Kaiflex with Kaiflex protect) were investigated. Prices for these materials are relatively very high, and it became apparent that these materials could only be used with an outside cover in underground installations. The combined costs of insulation materials and covers were well outside any cost-effective price range. Notwithstanding these considerations, the foam material referred to herein may comprise any insulation material as an alternative for PU foam.

In the ideal solution, there is no need for shipping in large amounts of Backfill. As much substrate as possible will be put back into the trench after installation of the pipe. The rest of the space will be filled with foam. A possible problem might occur when there is a lot of material that cannot be used as trench filling. This material will generally be used on top of the trench, creating a heaped end result. If even more material is left, this may be scattered around, avoiding needing to transport it away from the building site at high cost.

Manufacturers of the pipes set standards for bedding and Backfill thereof. Because the pipes will be covered with foam and therefore protected from direct impact, the quality of the Backfill material will not be of any importance.

For specific installations, anchoring of the GRP pipe may or may not be necessary, depending on ground stability and the pipe will not be placed on steep sections. The NVE requires a safety factor of at least 1.1, and this requirement is very easily fulfilled, even with as thick as 30 cm foam layer around the pipe. There will be concrete anchoring blocks where any GRP pipe meets a Ductile Iron pipe and anchoring in the steep parts of a duct will consist of concrete blocks.

For other installations there might be a need for anchoring, and for every project an individually suitable form of anchoring will have to be found. Anchoring could be done with (reinforced) concrete or with rock bolts. Concrete anchors are cheap but take a long time to set. Rock bolts are either expansion shell anchors that have immediate load-bearing capacity, or are grouted, either with a resin or concrete. The grouted anchors take longer to install but have higher load-bearing capacity. The difficulty with anchoring is that the requirements per installation and even per anchor are different, so there is no one off-the-shelf solution that fits all scenarios.

The current reasoning is that the foam will provide so much grip and stability, that anchoring might not be needed at all anymore, even on steep slopes. Appropriately selected foam materials defining only bulk head type trench breakers are expected to be already able to stabilize a pipe on a considerable incline of the duct, so that comparable and even better results are to be expected in installations where the whole trench is filled with foam.

By using spray PU foam there is one further major advantage: there is no necessity for personnel to enter the trench during the Penstock installation process. Norwegian or other state regulations for the use of excavated trenches, known in Norway as 'Grøfteforskriften' state that if people are to set foot in the trench and the vertical height of the trench is greater than 2 metres, the trench walls have to be dug at a 45 degree angle, as depicted in for example FIG. 2. If the trench is closed within 24 hours and the ground is stable, a 53 degree angle is allowed. This means a lot of extra digging. This extra digging means an extra impact on the environment in two ways: firstly, extra fuel and more explosives have to be used to dig up extra material, and secondly, the visual impact and ground disturbance is much greater. This means that a lot more material than necessary for correct installation of the pipe needs to be dug up for safety reasons. If no worker is to set foot in the trench, as when foam is poured or sprayed from a location next to the trench, the trench may be dug at 90 degree side angles. This creates a huge saving on labour and makes trench-digging an easier operation.

With a large excavator the trench can be dug to the right depth without undue concern for the angle of the trench walls. The sprayer can then, from a side of the trench, spray a foam pillow that will serve as support for the pipe. The next length of pipe is suspended and lowered into the trench. An excavator can be used to push the pipe into the muffle. Then the sprayers can fill up the space under the pipe, next to the pipe and ending filling the trench up to 20 cm above the crown of the pipe. The next length of pipe can be installed whilst the previous length is being sprayed with foam. All of this can be done with the worker standing on the side of the trench.

Consequently, as soon as the trench is dug deep enough, the sprayer can start to install a trench breaker, stabilising the system mechanically. The time needed to dig the trench with vertical walls would be much shorter compared to the conventional digging process. Also, the width of the excavator bucket could be chosen so that the correct width of the trench is created, with minimal effort. This saves time on measuring and prevents over-excavation.

It is anticipated the new technology will require special training for specialised penstock installation teams, who will work very effectively together. Conservative estimates show that with this new technique it will be possible to install 100 meters of Penstock per day with a team of four workers. Using the current procedure about 12-18 meters of pipe can be installed per working day, using the same number of team members. A possibility may even be considered of using 2 spray machines per installation for even faster installation. Especially for larger installations it may be necessary to use two spray machines to keep up with the pipe installation.

All-in-all, this installation method will help to save a lot of time, it will create a safe worker environment and it will keep labour costs down. It will reduce $CO_2$ output because less excavation is needed and because there is no transport of heavy Backfill material required. The access roads will not need to tolerate truckloads of aggregate being delivered on-site and visual impact and ground disturbance will be kept to a minimum. Time needed for installation will be greatly reduced, and so will the noise pollution. All these factors combined make this solution a huge leap forward in Penstock installation.

National authorities are generally very strict on environmental impact. This creates a challenge to prove that underground use of polyurethane is safe and environmentally friendly. As stated before, this used to be a problem when HFC's were still needed as blowing agent. Nowadays, with the water blown foam, the environmental impact has become very low, and certainly lower than the traditional way of laying pipes. Moreover, the decreased risk of penstock failure, resulting from use of the present new installation technique, will also serve to protect the environment in later stages.

Herein below a description will follow of exemplary and/or preferred embodiments of the present invention, which are by no means to be interpreted as disclosing any limitation on the scope of protection of or for the present disclosure as defined in the appended claims, and are further elucidated with reference to the drawing, in which the same or similar elements, components and/or functional assemblies may be designated using the same reference numbers even for separate embodiments, and in which:

Figure 1:
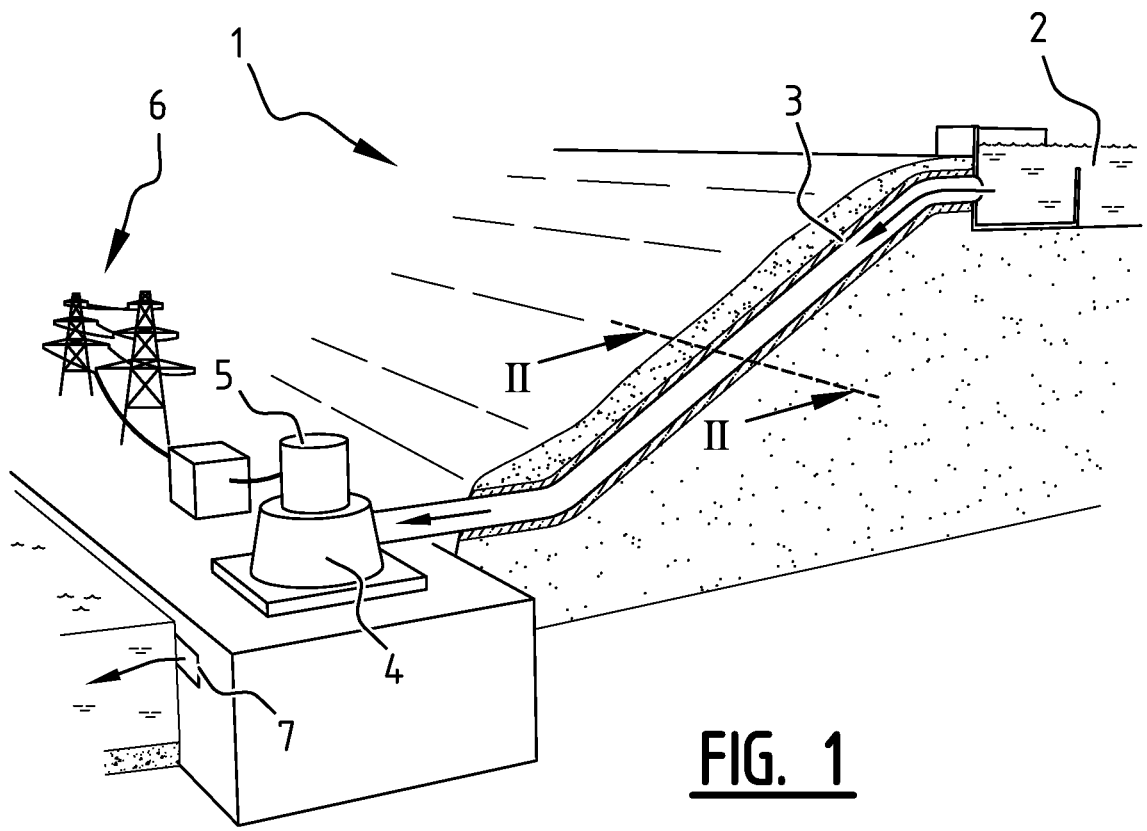
FIG. 1 is a perspective view of a hydropower installation according to the present invention.

In the embodiment of FIG. 1, hydropower installation 1 comprises a water supply 2, a duct 3 and a combination of a turbine 4 and a generator 5. Generator 5 is connected to a grid 6 for power supply of generated electrical power to grid 6. Water is allowed to be drained from an outflow 7, after having passed through turbine 4. Duct 3 spans a height difference between water supply 2 and turbine 4. Consequently, water can be propelled through turbine 4 at accelerated speed, based on gravity.

Figure 2:
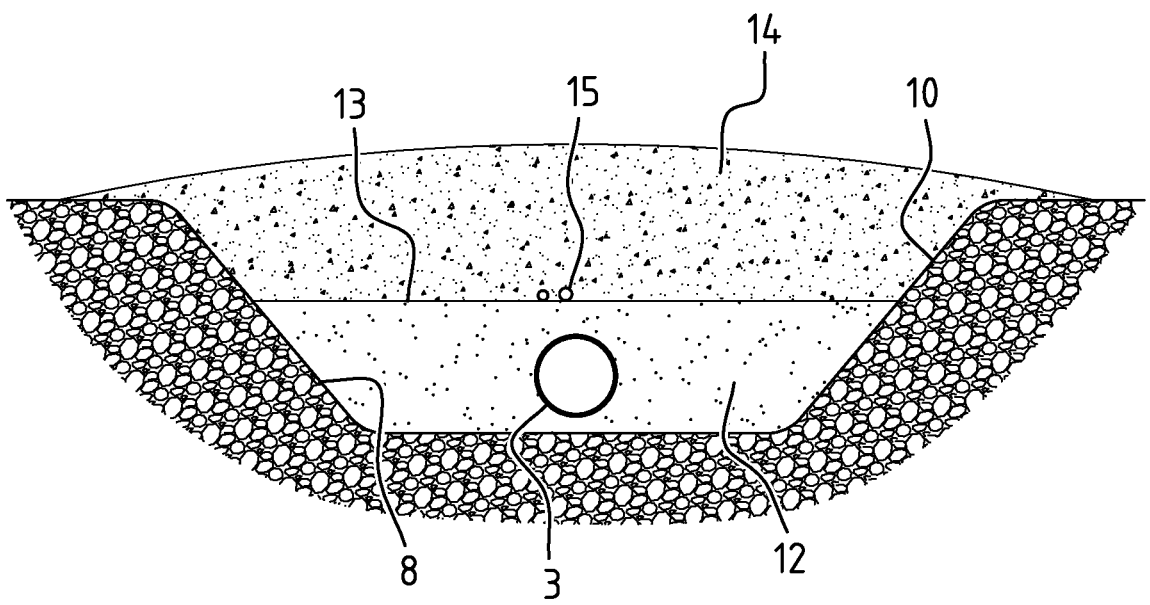
FIG. 2 is a cross sectional view of a pipe of the hydropower installation of FIG. 1.
Figure 4:
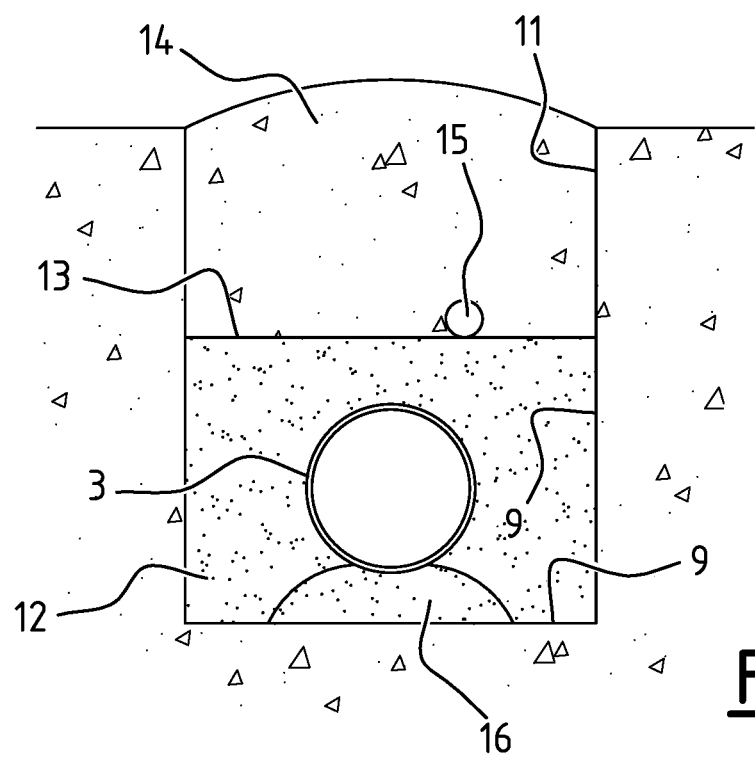
FIG. 4 is a cross sectional view of a pipe of a hydropower installation in a trench with rectangular cross section.

Duct 3 is buried. Potential configurations for burying duct 3 are shown in FIGS. 2 and 4. The embodiments of FIGS. 2 and 4 have in common, that trench 8 or trench 9 is dug, prior to arranging duct 3 therein. Trench 8 has sloping side walls 10, whereas trench 9 in FIG. 4 has practically vertical side walls 11. In particular the configuration according to FIG. 4 may be employed, if no personnel needs go into trench 9. Another similarity between the configurations according to FIG. 2 and FIG. 4 is that duct 3 is buried in insulating material, in particular foam material 12.

Foam material 12 is foam material for example from a group comprising: open Polyurethane (PU) foam; closed Polyurethane (PU) foam; water-blown PU foams; and HFC-blown PU foams.

Foam material 12 is applied to around duct 3 from the bottom of trench 8, 9 up to a level at a distance above the top of duct 3. Foam material 12 could be applied to entirely fill up the trench 8, 9. Separation element 13 is provided on top of foam material 12, for instance in the form of a geotextile. As a consequence of properties of the foam material 12, especially with respect to fluid permeation, in particular if the foam material is of a closed cell type, a drainage pipe 15 is arranged on top of or above separation element 13. In prior configurations, such a drainage pipe 15 may have been provided at the bottom of a trench 8. Backfill material 14, for example earth, rocks, dirt, sand and the like, excavated to form trench 8, 9, is provided on top of separation element 13 to enclose drainage pipe 15.

In addition to the representation of FIG. 2, the configuration according to FIG. 4 exemplifies the use of foam material to define at least one support in the form of for instance a pillow 16. Such pillows 16 can be arranged on the bottom of trench 8, 9, before lowering duct 3 into trench 8, 9, or by maintaining duct 3 or duct section thereof in a desired orientation and spraying or pouring an amount of foam material underneath duct 3.

Figure 3:
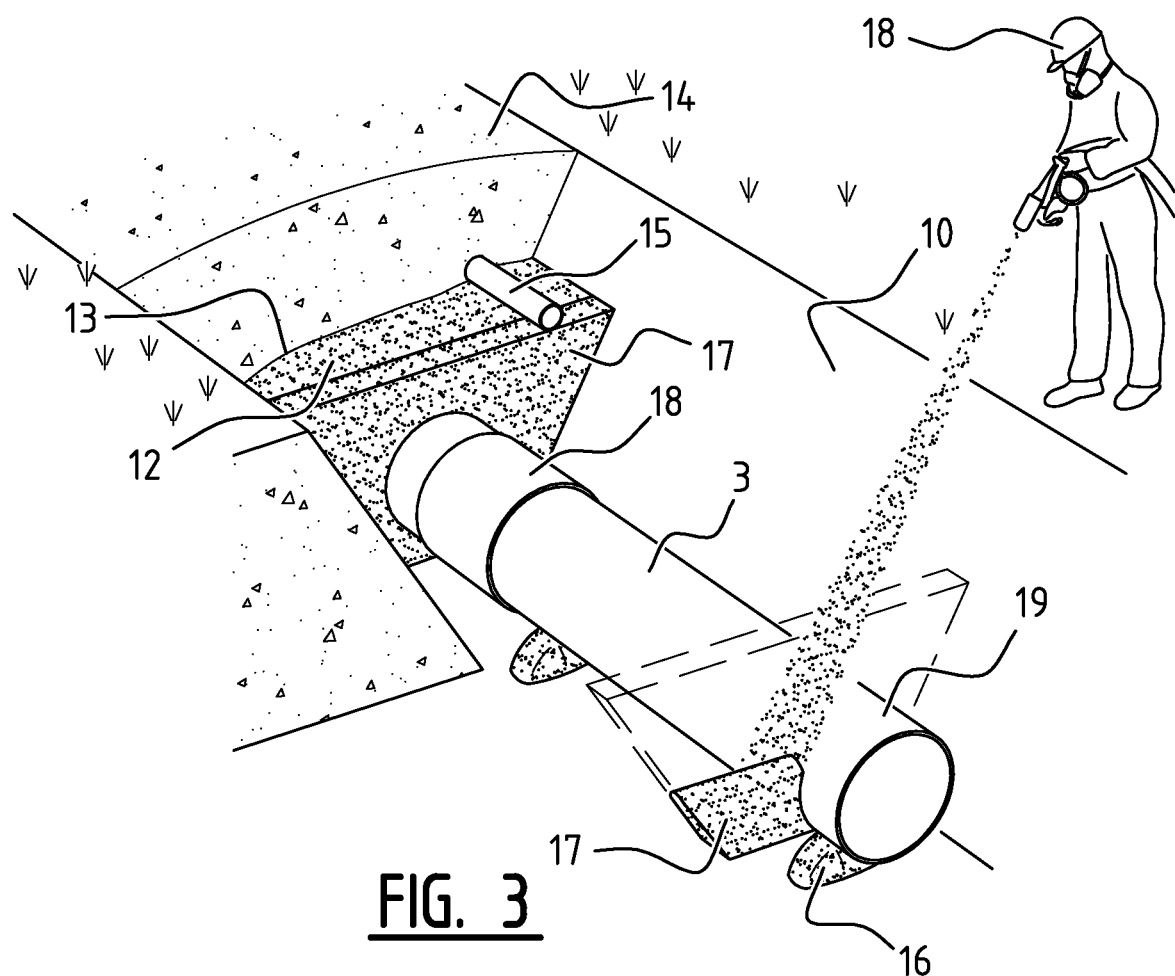
FIG. 3 is a perspective view of the FIG. 2 construction during installation.

Furthermore, in the embodiment of FIGS. 3 and 4, the trench comprises bulk head type trench breakers 17, which divide the trench into trench segments, wherein the trench breakers comprise a foam wall enclosing the duct at intervals. Evidently, such trench breakers 17 can be preconfigured, but are preferably formed in situ, as depicted in FIG. 3. There, a worker is busy spraying or pouring foam material into the trench to surround duct 3, lying on pillows 16, in one of the trench breakers 17. Pillows 16 can then be useful to provide support to duct 3 in a desired orientation, but can be omitted if other means for achieving a function of maintaining a desired orientation of duct 3 are provided. Trench breakers 17 could be omitted, but are functional in achieving a segmentation of a trench, holding duct 3 in place corresponding with a desired orientation, and subsequently fill trench segments between the bulkhead type trench breakers 17. Trench breakers 17 may be employed in the configuration according to FIG. 4 as well, even though in FIG. 4 no trench breaker 17 is particularly designated with a reference number.

Duct 3 is composed of plastic pipes or duct sections 19 of a length of for instance 6 meter or the like. Duct sections 19 can be attached to one another at connection, which could potentially be formed by a muffle 18, bandage type fibre mat or the like.

The plastic of duct 3 may comprise at least one material from a group comprising Glass Reinforced Polyester (GRP), and High Density Polyethylene (HDPE). Other suitable materials are also encompassed within the scope of the appended claims, also even materials that may only be developed in the future.

Figure 5:
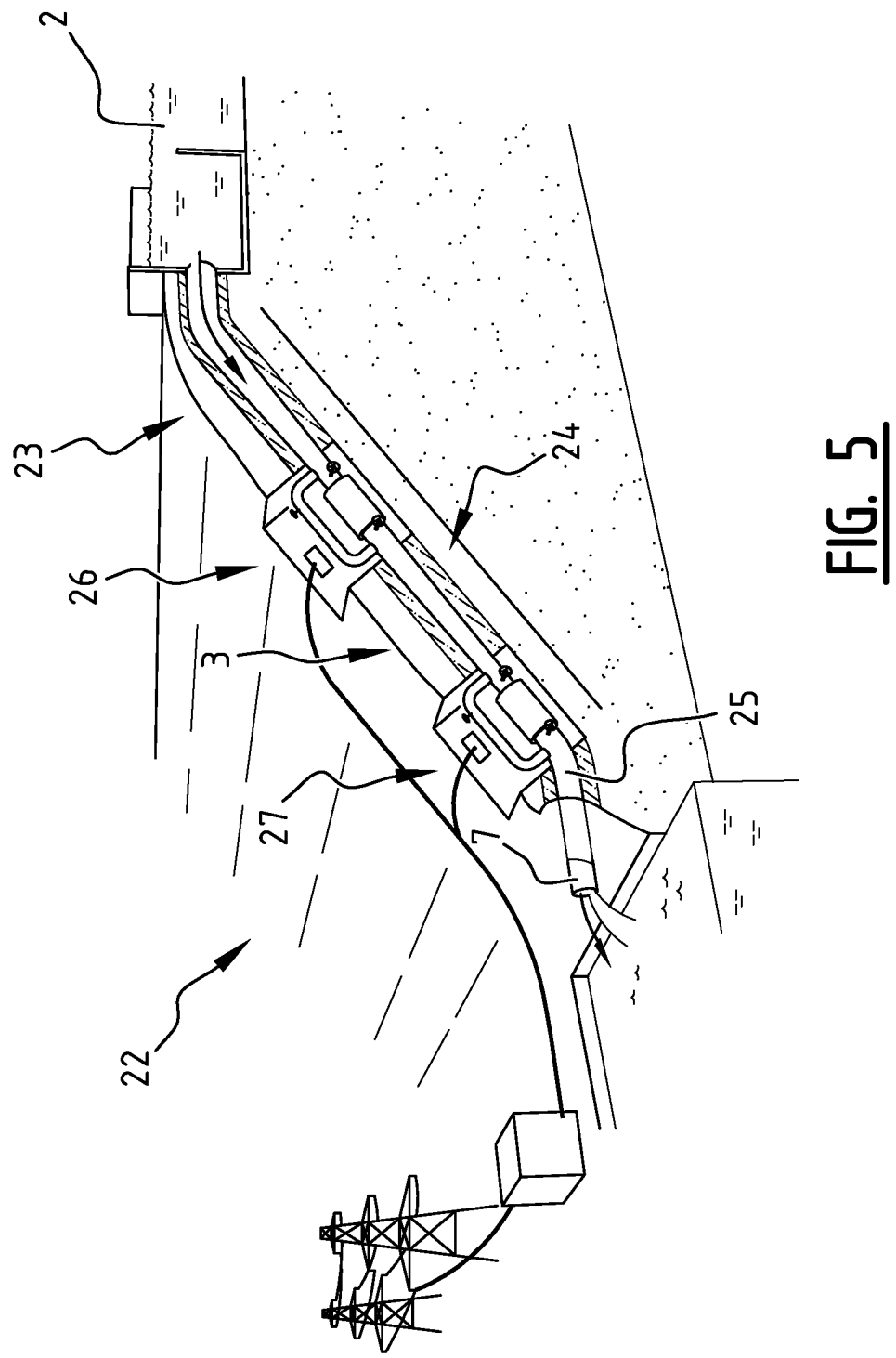
FIG. 5 is a cross sectional view of a hydropower installation according to a further embodiment of the present invention.

FIG. 5 exhibits a particular aspect and embodiment of the invention of hydropower installation 22, wherein duct 3 is divided into sections 23, 24 and 25. Each section can comprise a plurality of duct pipes 19. Sections 23, 24 are connected via intermediate energy generating station 26. Energy generating station 27 is comparable with the single station formed by turbine 4 and generator 5 in the embodiment of FIG. 1. By reducing the length of the entire duct 3 into sections, water pressure in and on duct sections is reduced, while, surprisingly, total efficiency can be maintained or at least approximates total efficiency in case of a single duct 3 without intermediate station 26. Additionally, should any one section rupture unexpectedly, remaining parts of the installation may stay operational.

The turbine/generator combination can be embodied much smaller and lighter than previous SHP set-ups using pressure based principles and heavy pressure resistant Ductile Iron ducts. In addition to being 'in-line' as here in FIG. 5, the turbine blades may have variable pitch, allowing both control of water flow through the system and a variation in energy extracted. Apart from the expected lower costs of such turbines, it also means a greater variation in the 'usable' water flow rates, and thus the ability to use more of the available water. The effect of this is to have a significantly higher energy production throughout the annual, weather-dependent rainfall cycle, where previously an engineering design decision normally had to be made to harvest energy based on a ratio average water flow. This is a direct result of being able to adjust for velocity, instead of pressure.

An effect of the present exemplary embodiment is to allow easier installation and replacement of the equipment. For example, a system with 1000 m of penstock, with 100 m of head, using a penstock with an initial diameter of 500 mm would normally require a single large turbine/generator, with a considerable civil engineering structure, at the end of the penstock. The set would weigh many hundreds of kilos, and require a 'station house' of at least 75 m3, with associated relatively heavy engineering structures, such as the inlet valve and housing, to tolerate the pressure system. The proposed new system has a final diameter of approximately 130 mm, and the turbine/generator set will be less than 1 m3, and be 'line replaceable' and interchangeable. Installation of a smaller penstock diameter is very significantly cheaper, especially in conjunction with the use of above described foam backfill technology.

Figure 6:
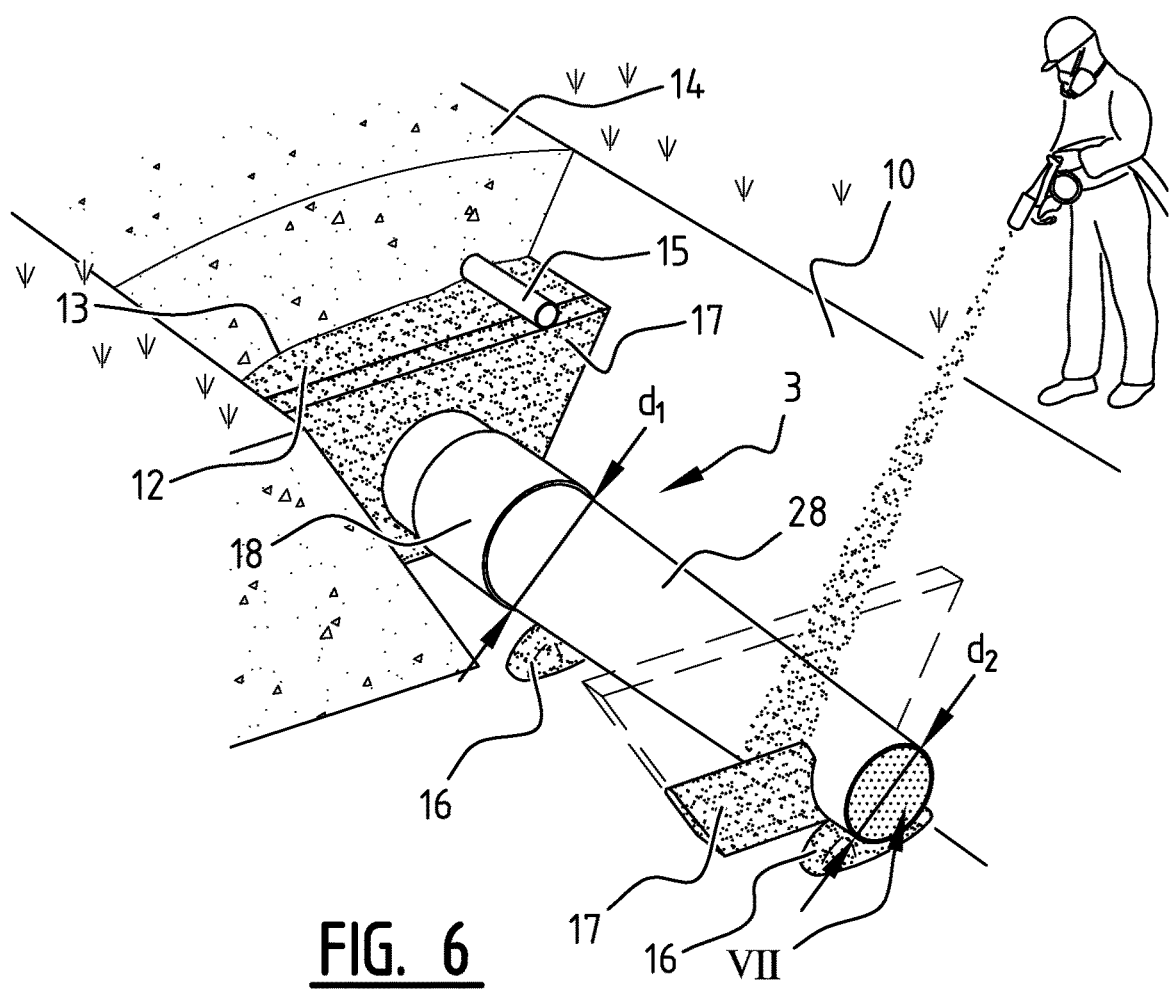
FIG. 6 is a perspective view of the FIG. 5 construction during installation.

FIG. 6 exhibits a particular aspect and embodiment of the invention of a hydropower installation having duct 3 with downstream converging or tapered duct sections 28. These converging duct sections can be nested for transport. An upstream end of duct sections 28 in duct 3 has a larger diameter d1, whereas a downstream end of duct sections 28 in duct 3 has a smaller diameter d2. For a remainder, the representation of FIG. 6 is essentially the same as FIG. 3.

From the indication of arrow VII it is apparent that duct sections 28 comprise internal dimples 20, which are described below in more detail in relation to FIG. 7, but these could be alternatively or additionally be embodied in any other aspect or embodiment of the present disclosure. However, it is noted here that the dimples or any alternative laminar flow enhancing protrusions and/or depressions will allow for acceleration of the water flow through duct 3, to enable the above described segmentation of duct 3 with at least one intermediate energy generating station 26, and ensure that sufficient power is generated by stations 26, 27 to allow generation of power at at least the same efficiency as if a singly duct without segmentation is realized. The tapered duct sections 28 induce an acceleration in water flowing there through. As the pipe sections reduce in diameter in the flow direction of water through duct 3, and the velocity increases, it is to be anticipated that there will probably come a point where either the system reaches a fluid-dynamically-governed point, where chaotic or non-laminar flow is induced, or that the velocity is such that a turbine of that diameter is not able to extract energy efficiently. This can be counteracted to some point, for example with laminar flow promoting features, such as inside protrusions and/or dimples as described below, but such an effect of chaotic or non-laminar flow is anticipated to be more likely to occur—ultimately at the turbines—as the duct is longer. This consideration correlates directly with a need to limit—in the embodiment of FIG. 5—lengths of duct sections 23, 24. These duct sections 23, 24 lead respectively to an intermediate energy generating station 26 or generation station 27 at the end of duct 3. As a consequence, lengths of duct sections 23, 24 are to be kept shorter than a distance over which the chaotic or non-laminar flow will begin to occur.

Figure 7:
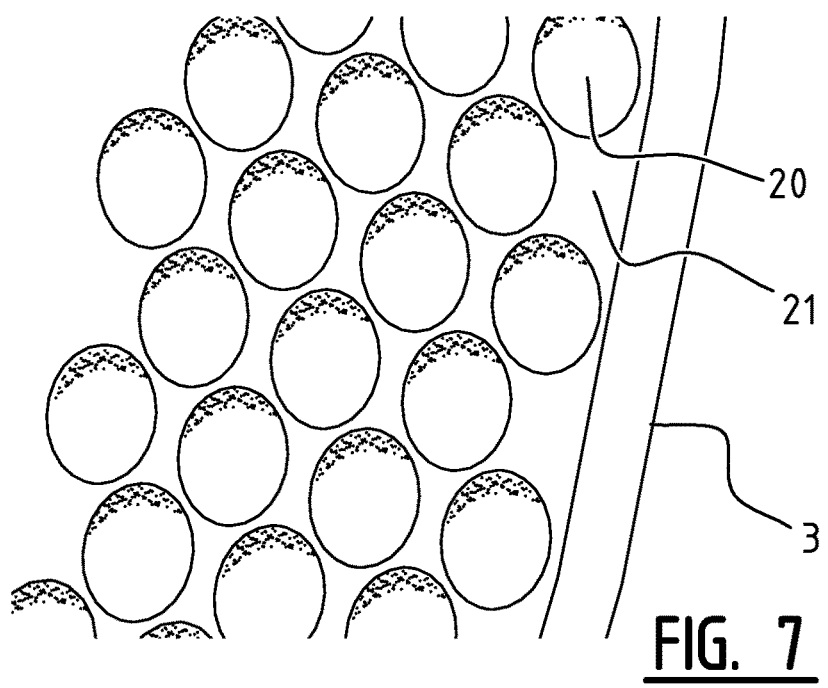
FIG. 7 is a detailed perspective view of an inner wall of a pipe of a hydropower station according to the present invention, exhibiting internal dimples.

In more detail about FIG. 7: this FIG. 7 exhibits a particular aspect and embodiment of the invention, wherein duct 3 comprises internally oriented protrusions defining dimples 20, formed in an inside surface 21 of the plastic of duct 3. Alternatively, a basically ductile iron duct may be provided with an inner lining or coating, comprising such dimples. The dimples are comparable in shape, but not necessarily in dimension, with depressions in an outer surface of a golf ball, and have been found to considerably improve laminar flow of water through duct 3, thus reducing turbulence or even the occurrence of water hammer. This contributed to the durability of duct 3 in particular in relation to the expected life of ductile iron duct.

There is a significant increase in system efficiency, through lower energy loss as a result of fewer energy state changes and decreased drag on the main water mass in the penstock, as a result of the increased laminar flow caused by the dimples in the inner pipe surface.

Further, dimples are expected to be more easily realised in plastic duct 3, but these may even be equally well formed in ductile iron or steel duct 3, even if this means creating a plastic lining or coating in the interior of a ductile steel duct 3 to realize the extensions/protrusions designed to enhance laminar flow. A lining or coating to provide the laminar flow promoting features can moreover be replaced by a subtle roughening of the interior of steel or iron duct, to be able to dispense with having to apply such a lining or coating and still allow sufficient acceleration of the water flow through duct 3 to enable the envisaged degree of enhanced flow to allow intermediate power generators, or enhance a configuration with a single turbine and generator assembly at an end of an unsegmented duct 3. In fact, these measures of tapered duct sections and/or of laminar flow improvement allow for a hydropower installation to be based on acceleration, rather than on pressure as in the conventional ductile iron duct and conventional backfill systems. Thereby also, the weight of the Penstock in use, when filled with water, may be reduced, as the working principles of pressure are relinquished for lighter acceleration based installations. These weight related considerations correlate directly with the use of GRP for the duct and foam as embedment 12 and/or support 16 and/or trench breaker 17 of duct 3.

A particularly beneficial embodiment can be achieved, when a gradual and calculated decrease in pipe diameter according to FIG. 6, and thus volume, is combined with the use of dimpled inner pipe surfaces as shown in FIG. 7 to induce greater friction at the water/pipe boundary, but increased laminar flow in the inner water column. In effect, the prior art elongate duct pipe changes shape from a cylinder to a very long cone, with an inner surface similar to a golf ball. If the pipe did not decrease in diameter and therefore volume, there would be a pressure decrease in proportion to the increase in velocity: in other words, the pipe would collapse due to vacuum. This correlates directly with acceleration based principles instead of pressure based hydropower principles to which foam and GRP also contribute, as these are viable in view of the lower weight constraints for acceleration based systems in comparison with heavy ductile iron comprising and pressure based prior art systems.

One of the problems with shutting down an old pressure-based SHP system is the necessity to spread the emptying of the penstock over time. If a surge chamber is used, and there is resistance to the water at the head of the pipe, or resistance to air at atmospheric pressure entering the pipe to replace the water, a vacuum or pressure less than 1 Atmosphere will occur. Water does not like to be compressed or expanded mechanically, so the mechanical effect of negative pressure in water is extremely powerful. This means that emptying a penstock without allow air into the system will lead inevitably to a catastrophic failure of the pipe, due to collapse.

However, this dynamic can be used to advantage; if the available water is greater than that which the pipe can handle through 'natural' acceleration, a small pressure differential can be created by creating lower resistance to acceleration in a lower section of the pipe, thus creating a 'siphon' and increased velocity in the intake, and therefore a greater flow rate. The pressure changes do not need to be great to increase the flow rate, but they must be very carefully controlled; for example, in our initial test calculations, to double the flow rate from 650l/s to 1300l/s, the initial velocity must also double, from 1 m/s to 2 m/s. That is a high 'absolute' increase, but a manageable 'real world' physical increase that will occur over time in the water mass before the intake. Given that the intake will certainly already be under some pressure due to the head of the settling pool, this potential increase in flow should be manageable and it is of course important to design the upper turbine/generator sets to handle the extra load. Also, given that most GRP pipes in SHP are at least PN6-SN5000, there should be no problem with the variation in pressure. Certainly, the initial indications are that the financial return on the 'flood' energy that can be recuperated should compensate for any increases in pipe specifications. The additional advantage of the above described siphon effect is to allow water to enter the Penstock 'clean', by using a downwards-facing inlet. This is extremely important in a system that relies on velocity, to avoid damage to the turbines by solid matter in suspension in the water source.

Current electricity generation in hydropower is normally designed to provide electricity to the National Grid. Due to the nature of SHP, most installations are sufficiently remote to require costly additional cabling from the source of generation to the National Grid. This system of feeding in electricity requires complex regulation and transformation of the electrical current, through synchronizing and control of phases. In practice, this means that useful electricity can only be produced in a given and carefully calculated range of electrical generator output. Although the system described here may also be used to provide electricity to the national grid, the ability of the system to extract more energy over a wider range of water flows than classic hydropower configurations means that applications such as the production of hydrogen from hydrolysis using direct current electricity becomes more feasible, as provision of electricity for hydrolysis does not require careful regulation of current and phases, unlike electricity production for the national grid. Apart from the cost savings associated with avoiding the need for regulation and transformation, such a system of local and immediate consumption also saves money by removing the need for cabling to the national grid. This grid connection challenge, which exists on both a technical, financial and regulatory level, is a major reason for negative investment or construction decisions in SHP. The ability to provide less technically demanding power generation for applications requiring immediate and local consumption is important in increasing the number of viable SHP projects, and thus contributes to the stock of renewable power generation sources. The inventor considers that the above described embodiments will facilitate the development of SHP projects for the purpose of hydrogen production.

The skilled person will understand that the application of a foam embedment and/or a foam support is independent from a hydropower installation being pressure-based or velocity-based.

Although the above described embodiments relate to preferred embodiments of the invention depicted in the accompanying drawing, these exemplary embodiments are intended only to illustrate the invention and not to limit in any way the scope of the invention as defined in the appended claims. With respect to required features according to the appended claims, it is further noted that the defined features are intended to include also alternatives, such as currently not yet available insulating material, referred to herein as foam material. Likewise, a plastic pipe can be formed from other materials than GRP. Accordingly, it should be understood further that where features mentioned in the appended claims are followed by reference signs, such signs are included solely for the purpose of enhancing the intelligibility of the claims and are in no way limiting on the scope of the claims. Furthermore, it is particularly noted that the skilled person can combine technical measures of the different embodiments. The scope of the invention is therefore defined solely by the following claims.

The invention claimed is:

1. A hydropower installation, comprising
a water supply and an energy generating station, where the water supply is at a higher vertical level than the energy generating station; and
a duct extending between the water supply and the energy generating station,
wherein the duct is arranged on a support and enclosed by an embedment, where at least one of the support and the embedment comprise a foam material to provide enhanced geotechnical stability for the duct; and
wherein the duct, support and embedment are disposed in a trench, and wherein the foam is applied to fill the trench, surround the duct by the foam on all sides, and enclose the duct in the foam material along the entire length of the trench so that the duct is stuck to, and disposed inside, a homogenous mass of foam so as to be completely immobilized.

2. The hydropower installation according to claim 1, wherein the duct comprises plastic pipes.

3. The hydropower installation according to claim 2, wherein the plastic of the plastic pipes comprises at least one material from a group comprising Glass Reinforced Polyester (GRP), and High Density Polyethylene (HDPE).

4. The hydropower installation according to claim 2, wherein the foam readily bonds with the plastic pipes, thereby maximizing a stabilizing area about the plastic pipes.

5. The hydropower installation according to claim 1, wherein the foam material is selected from a group comprising: open Polyurethane (PU) foam; closed Polyurethane (PU) foam; water-blown PU foams; and HFC-blown PU foams.

6. The hydropower station according to claim 1, wherein the duct comprises at least two duct sections in a downward orientation, wherein an intermediate energy generating station is arranged between the duct sections of the duct.

7. The hydropower station according to claim 1, wherein the duct comprises internally extending protrusions configured to promote a laminar flow of fluid through the interior of the pipe.

8. The hydropower installation according to claim 7, wherein the protrusions comprise dimples on an interior surface of the pipe.

9. The hydropower installation according to claim 1, wherein the duct is arranged on supports onto which supports pipe sections are deposited and interconnected, wherein the supports comprise a foam pillow.

10. The hydropower installation according to claim 1, wherein the hydropower installation further comprises bulk head type trench breakers dividing the trench into trench segments, wherein the trench breakers comprise a foam wall enclosing the duct at intervals.

11. The hydropower installation according to claim 1, wherein the duct is tapered.

12. The hydropower installation according to claim 11, wherein successive duct sections of the duct are individually tapered to define a continuous tapering of the duct when the duct sections are connected to one another.

13. The hydropower installation according to claim 11, wherein successive duct sections of the duct are mutually identically tapered.

14. The hydropower installation according to claim 1, wherein duct sections of the duct are tapered and configured to be nested during transport.

15. The hydropower installation according to claim 1, wherein water pressure inside the duct is essentially atmospheric over the entire length of the duct.

16. The hydropower installation according to claim 1, wherein the energy generating station comprises a turbine, wherein blades of the turbine have a variable pitch in dependence on an instantaneous water velocity at the turbine to prevent pressure differences.

17. The hydropower installation according to claim 1, wherein the foam stabilizes the bottom of the trench by binding to sediment in the trench to maintain the sediment in place.

18. The hydropower installation according to claim 1, wherein backfill material is disposed over the foam, and wherein stresses on the foam, created by a weight of the backfill material, are transferred to the sides of the foam, minimizing compression on the duct.

19. The hydropower installation according to claim 18, forces applied by the weight of the backfill material are transmitted to the trench surface due to compression and tensile strength properties of the foam.

20. The hydropower installation according to claim 1, wherein a flexibility of the foam allows for thermal expansion and contraction of the duct.

* * * * *